H. L. JOHNSON.
CARTON SEALING MACHINE.
APPLICATION FILED AUG. 4, 1908.

1,118,424.

Patented Nov. 24, 1914.
8 SHEETS—SHEET 3.

H. L. JOHNSON.
CARTON SEALING MACHINE.
APPLICATION FILED AUG. 4, 1908.

1,118,424.

Patented Nov. 24, 1914.
8 SHEETS—SHEET 4.

UNITED STATES PATENT OFFICE.

HARRY L. JOHNSON, OF BATTLE CREEK, MICHIGAN, ASSIGNOR, BY DIRECT AND MESNE ASSIGNMENTS, TO JOHNSON AUTOMATIC SEALER COMPANY, LTD., OF BATTLE CREEK, MICHIGAN.

CARTON-SEALING MACHINE.

1,118,424.  Specification of Letters Patent.  Patented Nov. 24, 1914.

Application filed August 4, 1908. Serial No. 446,893.

*To all whom it may concern:*

Be it known that I, HARRY L. JOHNSON, a citizen of the United States, residing at the city of Battle Creek, county of Calhoun, and State of Michigan, have invented certain new and useful Improvements in Carton-Sealing Machines, of which the following is a specification.

This invention relates to improvements in carton sealing machines.

My invention is particularly adapted for the closing and sealing of the tops of filled cartons, and I have illustrated it herein embodied in a machine especially designed and adapted for that purpose, although certain features of my improvements are adapted for use in machines for setting up or closing the bottom flaps of cartons, before they are filled.

The main objects of this invention are: First, to provide an improved carton sealing machine of large capacity,—that is, one adapted to perform a large amount of work in a given time. Second, to provide an improved carton sealing machine in which the cartons are effectively handled without injury thereto, or the liability of their being distorted. Third, to provide in a structure of the class described an improved flap-folding, sealing and holding means.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which:

Fig. 3 is a plan view of the structure with certain parts in detail as in Figs. 1 and 2.

In the drawings, similar reference characters refer to similar parts throughout the several views, and the sectional views are taken looking in the direction of the little arrows at the ends of the section lines.

Figure 1:
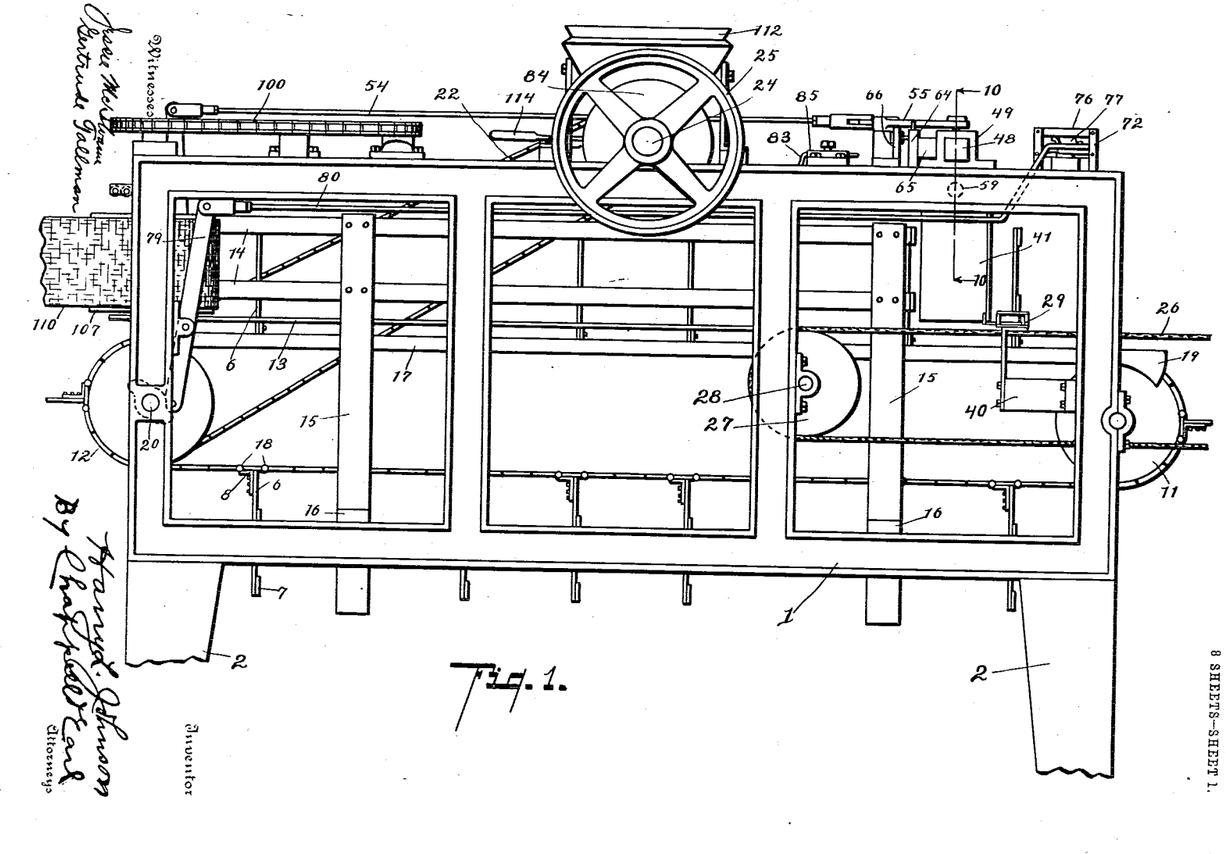
Figure 1 is a side elevation of a carton sealing machine embodying the features of my invention, portions of the feed and delivery devices being broken away, also portions of the supporting legs.
Figure 2:
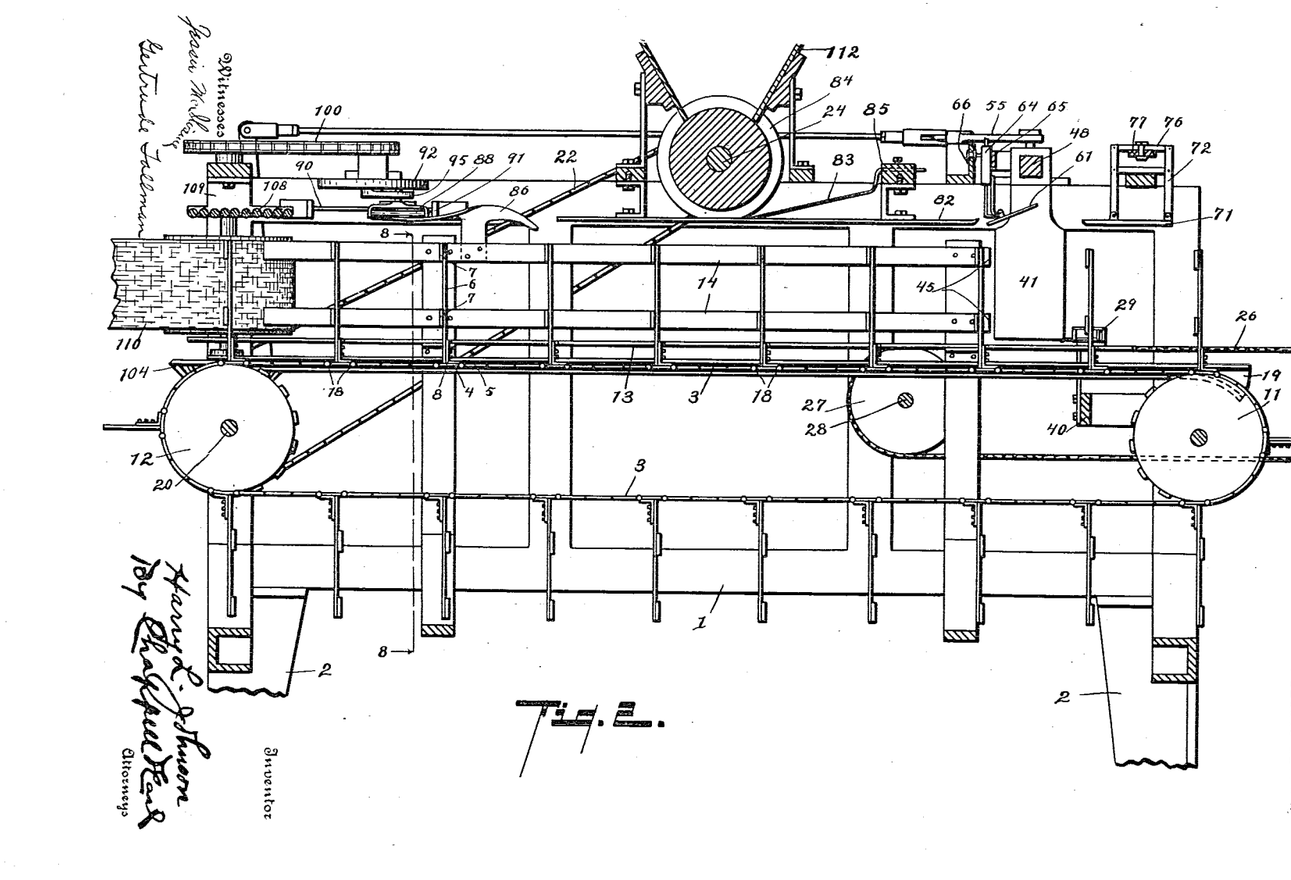
Fig. 2 is a vertical longitudinal central section, taken on a line corresponding to line 2—2 of Fig. 3, certain parts being shown in detail, as in Fig. 1.
Figure 8:
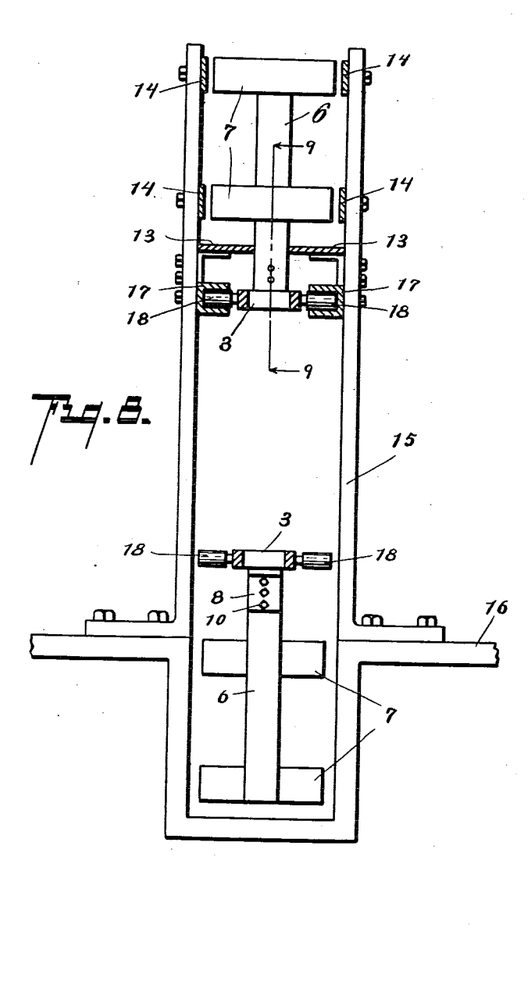
Fig. 8 is a vertical transverse section, taken on a line corresponding to line 8—8 of Fig. 2, showing details of the conveyer.
Figure 9:
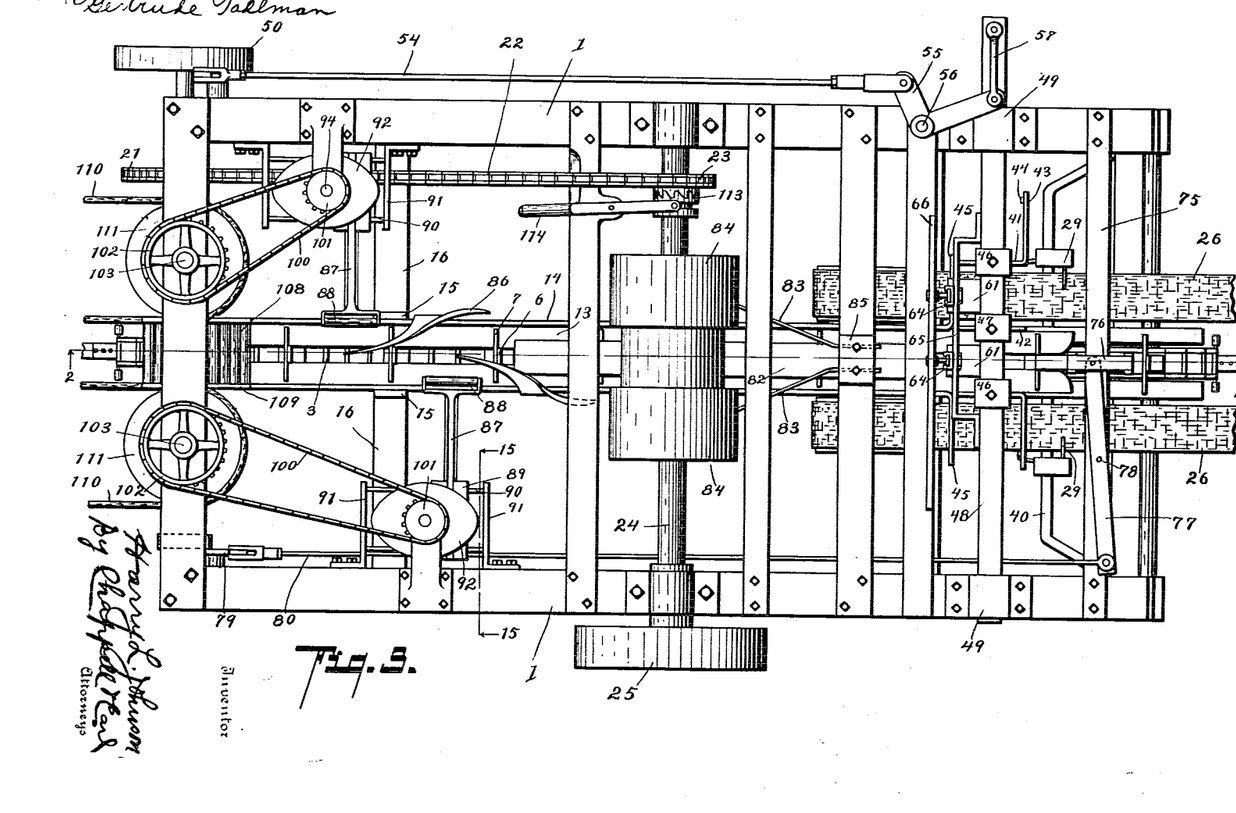
Fig. 9 is a detail section, taken on a line corresponding to line 9—9 of Fig. 8.

Referring to the drawing, the frame 1 of my improved carton sealing machine is preferably rectangular in general form, and is made up of suitable longitudinal rails connected by vertical and horizontal cross pieces. I preferably support this frame in an elevated position by means of suitable legs, as 2. The mechanism is largely arranged and supported within this frame, consisting of a conveyer for carrying the cartons through the flap folding and sealing mechanism which preferably consists of the propelling chain, which is generally designated by the numeral 3, and is made up of the links 4 and 5 in Figs. 2 and 9. On the links 4, I mount carton engaging flights which preferably consist of the standard 6, having cross pieces 7 thereon. These standards are adjustably secured to the links by means of the angle-shaped brackets 8, the adjustment being affected by means of the securing screws 9 and the set screw 10. (See Fig. 9.) This propelling chain 3 is carried by the sprocket wheels 11 and 12 arranged at the front and rear, respectively of the machine. A conveyer way is arranged above the propelling chain and preferably consists of the bottom pieces 13, between which the standards 6 of the flights project and the side pieces 14 which are preferably located oppositely to the cross pieces 7 on the standards 6. The bottom pieces 13 project forwardly beyond the side pieces 14 to receive the cartons from the feed device which will be hereinafter described. This conveyer way is supported on the uprights 15 mounted on suitable cross pieces 16 on the main frame, see Fig. 8.

The upper reach of the propelling chain is supported between the sprocket wheels 11 and 12, by means of the ways 17 in which the rollers 18, carried by the links 4 are arranged to travel, so that the flights are held against vertical movement when in engagement with the cartons. These rollers are preferably arranged in pairs so that they also prevent the tilting of the flights while they are in engagement with the cartons. The forward ends of the ways, 17 are flared at 19, so that the rollers 18 readily pass into the ways as they pass over the sprocket wheel 11. I thus secure the conveyer by which the cartons are carried forward through the machine in a manner which advances them positively while they are being acted upon by the flap-folding sealing devices.

The sprocket wheel 12 is loosely mounted upon the shaft 20, arranged across the rear of the frame. The sprocket 12 is driven through the gears 104, 105 and 106 the gears 106 being secured to the sprocket and the gear 105 being secured to the shaft. The shaft 20 is driven through the sprocket wheel 21, the chain 22 and the sprocket wheel 23 on the driven shaft 24, which is provided with a belt pulley 25. (See Figs. 2 and 3.)

The cartons are preferably delivered to the sealing conveyer described by means of an automatic feed, which is preferably substantially the mechanism described in my United States Letters Patent No. 976,264, issued November 22, 1910, for carton sealing machines, and preferably consists of a pair of feed belts 26 arranged with their rear ends at each side of the forward end of the bottom of the sealing conveyer or way, the top or upper plane of the feed belts being in substantially the same plane as the top of the bottom of the conveyer way, so that the cartons may be shifted laterally from the feed belts onto the way.

The rear ends of the feed belts 26 are supported by the pulleys 27 mounted on the shaft 28. As these belts may extend any desired distance from the machine and be arranged so as to receive the filled cartons from a carton filling machine, or the filled cartons may be placed thereon by hand, I do not illustrate the supporting or delivering mechanism therefor herein. They are, however, preferably driven at a speed which exceeds somewhat the speed of the carton sealing conveyer, the object being to insure a full supply of the cartons to the sealing mechanism,—that is, that they may be delivered thereto as rapidly as required. As the cartons are carried forward by the feed belts, they are engaged by the stops 29 and held thereby until these stops are tripped, as will be hereinafter described. The stops are substantially the same as those illustrated and described in my patent hereinbefore referred to.

Figures 9, 18, 19:
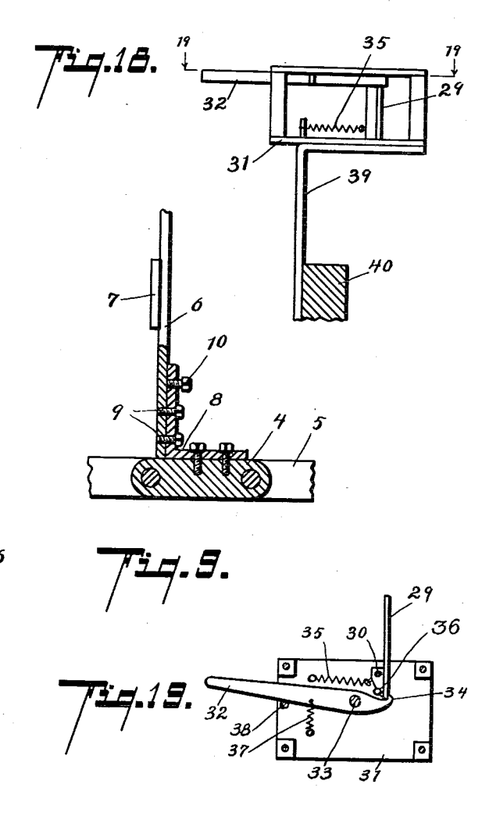
Fig. 18 is a detail side elevation of one of the carton stops.
Fig. 19 is a horizontal section taken on a line corresponding to line 19—19 of Fig. 18.

The stops 29 are mounted on the vertically-arranged pivots 30, carried by the stop frames 31 and are arranged so that they project over the feed belts when in their extended or engaging position. The stops 29 are held in their extended position by means of the pivoted latches 32, the latches being pivoted at 33 and having hooks 34 at their inner ends adapted to engage the inner ends of the stops. The stops are automatically returned to their outer or extended position, when released by the passing cartons, by the coiled springs 35. The stops 36 are provided for limiting the outer or extended movement of the stops 29. The latches 32 are held yieldingly in their engaging position by means of the coiled springs 37, suitable stops, as 38, being provided for limiting their movement. These stop frames are mounted on suitable brackets 39 provided therefor, the brackets being carried by the supporting piece 40, arranged transversely across the frame. These stop frames are preferably in the form of top and bottom plates separated by suitable spacing members, the stops and latches being pivoted on the top and bottom plates. The details of these stops are illustrated in Figs. 18 and 19. To the rear of these stops I preferably locate the laterally moving carton shifters preferably consisting of the shifter plates 41 and 42, the plate 42 being centrally located and coacting with both the plates 41, forming, in effect, a pair of shifters.

Figures 10, 11:
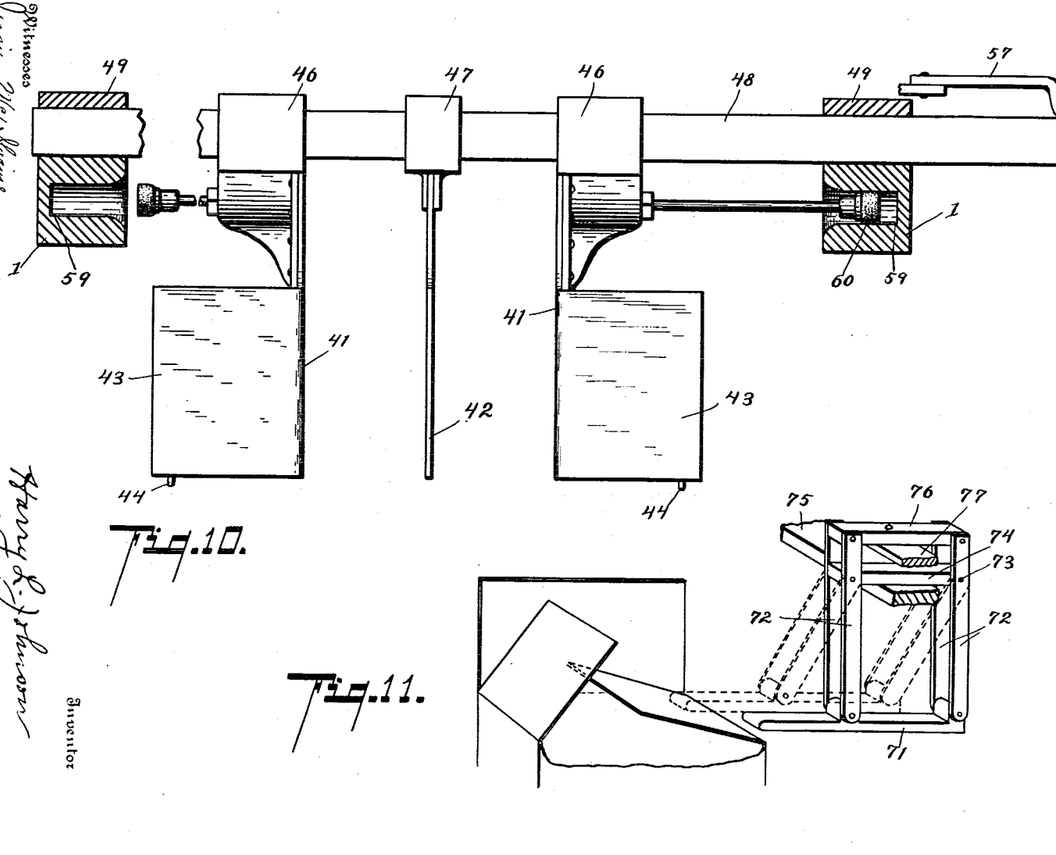
Fig. 10 is an enlarged detail vertical section taken on a line corresponding to line 10—10 of Fig. 1, showing details of the carton transfer mechanism by which the cartons are transferred from the feed conveyers to the sealing conveyer.
Fig. 11 is a detail perspective view of the mechanism for folding the rear inner flap, the movement of the folder being indicated by dotted lines, it being shown in its operative relation to a carton.

I provide shifting stops or guard plates 43 which are moved alternately into and out of their operative position above the feed belts. These stop or guard plates 43 are preferably carried by and project outwardly from the forward edges of the shifter plates 41—see Figs. 3 and 10. The shifters, as they are reciprocated, are moved first over the one and then over the other of the feed belts to receive the cartons and carry them onto the conveyer way between the flights of the propelling chain by which they are carried forward. As the shifter moves inwardly, or on its delivery stroke, the latch 32 is engaged by the trip, 44, carried by the guard plate 43, which releases the stop allowing the carton to advance against the plate 43. As the guard plate 43 is retracted from the front of the carton, it is advanced by the feed belt against the fixed end plate 45 of the shifter. This end plate 45 is mounted on the rear end of the side pieces 14 of the conveyer ways. The shifter plates 41 and 42 are connected by means of suitable hangers 46 and 47 to the shifter rod 48, which is mounted in suitable bearings 49 to be reciprocated therein, thus carrying first one shifter over the feed belt and then the other. This shifter rod is operated through the cam wheel 50 having a cam groove 51 therein, the cam wheel being mounted on the shaft 20. This cam wheel acts upon the lever 52 which is suitably pivoted on the frame and connected by the rod or link 54 to the bell crank lever 55 pivoted at 56 on the main frame. The other arm of this bell crank lever 55 is connected by the link 57 to the shifter rod 48. The lever 52 is preferably provided with a roller 58, which travels in the cam groove 51 of the cam wheel, in Figs. 3, 5 and 6. By this connection, the shifter is connected to operate so that it is timed in its movement with the movement of the propelling chain of the carton sealing conveyer, so that the cartons are delivered between the conveyer flights. To relieve the mechanism of shock, I preferably provide a pair of dash pots 59 with which the plungers 60 coact, the plungers being carried by the hangers 46 for the shifter plates 41, see Fig. 10.

Figure 12:
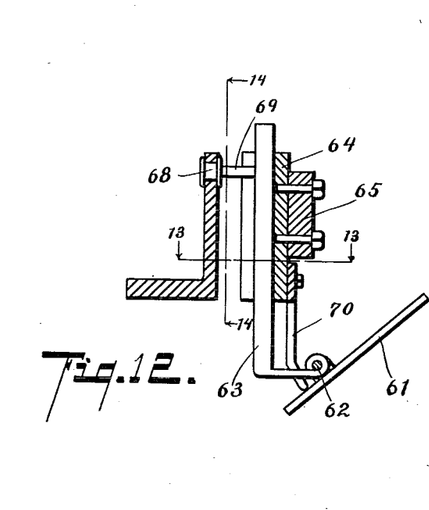
Fig. 12 is a vertical section, taken on a line corresponding to line 12—12 of Fig. 13, showing details of the front inner flap-folding mechanism.
Figure 13:
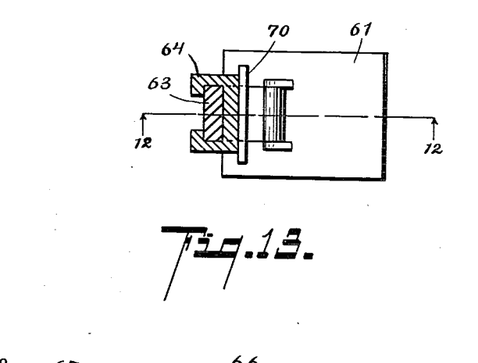
Fig. 13 is a detail section taken on a line corresponding to line 13—13 of Fig. 12.
Figure 14:
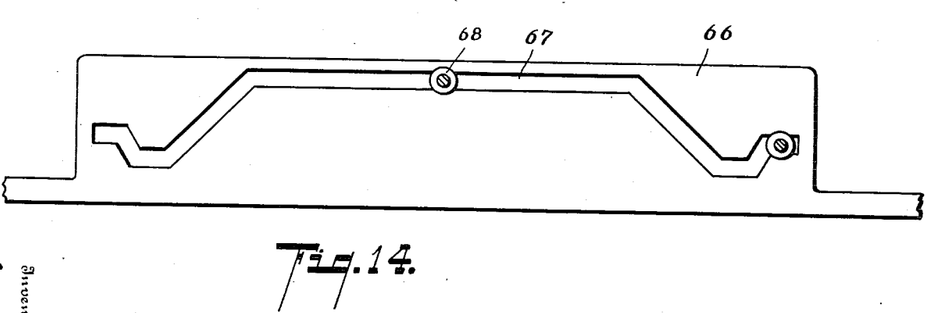
Fig. 14 is a vertical section, taken on a line corresponding to line 14—14 of Fig. 12, showing the cam plate for actuating the folding mechanism shown in Figs. 12 and 13.

To compress the food in the package, should it be rounded up therein as is customary, and also to turn the rear inner flap in the proper direction, I provide a flap folder and presser which is actuated by the shifting movement of the shifters. This mechanism preferably consists of the folder plate 61 which is pivoted at 62 on the reciprocating support 63. This support is mounted to move vertically in a suitable guide way 64, which is carried by the bar 65 mounted upon the shifter rod 48. See Figs. 3, 12 and 13. The support 63 is reciprocated by means of the cam plate 66 which has a cam slot 67 therein in which the roller 68 travels, the roller being mounted on the pin 69 carried by the support 63. The folder plate 61 bears over the end of the slotted arm 70, so that, as the support is reciprocated, the folder plate is rocked on its pivot 62. The cam groove 67 is preferably a double cam acting on both of the supports 63. See Fig. 14. The cam groove or slot is V-shaped toward each end, so that, during the shifting movement the plate 61 is thrown down and raised again. I also provide a rear inner flap folder which is preferably arranged to be actuated simultaneously with the delivery of the cartons onto the carton sealing conveyer. This preferably consists of a striker 71 which is supported by links 72, arranged in pairs. These links are pivoted at 73 on the block 74, carried by the cross piece 75 of the frame. The upper ends of the links are connected by the block 76 to which the end of the lever 77 is connected, the lever being pivoted at 78 on the cross piece 75. See Figs. 3 and 11. It will be obvious that as this lever is rocked on its pivot, the striker 71 is swung on its links, its forward position being indicated by dotted lines in Fig. 11, where details of the mechanism are illustrated.

Figure 4:
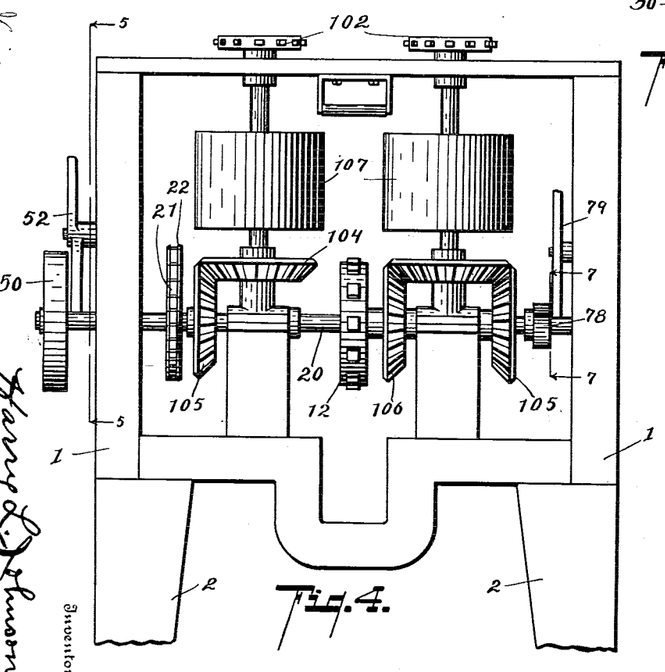
Fig. 4 is an end elevation looking from the left of Figs. 1, 2 and 3, part of the delivery device being omitted.
Figures 5, 6, 7:
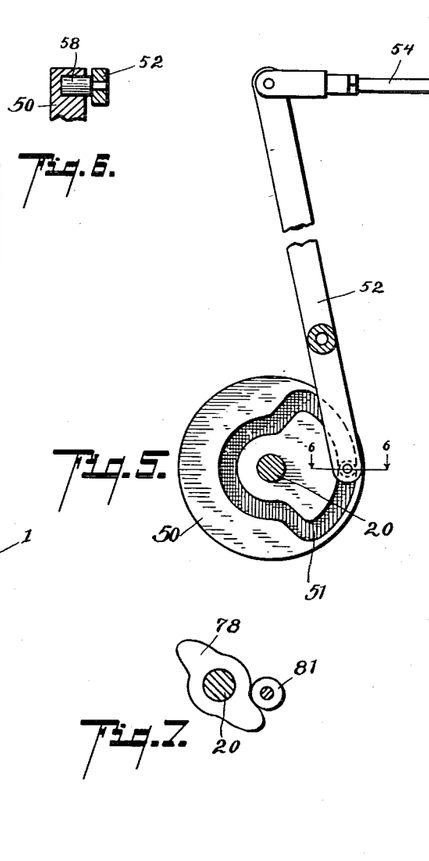
Fig. 5 is an enlarged detail section, taken on a line corresponding to line 5—5 of Fig. 4, showing details of the drawing mechanism for the feed delivery.
Fig. 6 is a detail section, taken on a line corresponding to line 6—6 of Fig. 5.
Fig. 7 is an enlarged detail section, taken on a line corresponding to line 7—7 of Fig. 4, showing further details of the driving mechanism.
Figure 15:
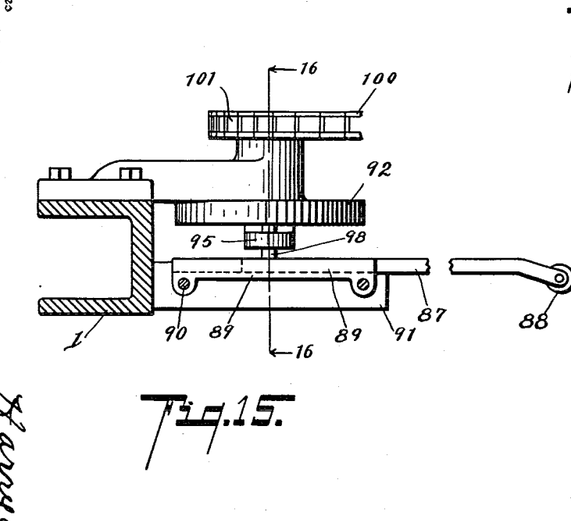
Fig. 15 is a detail vertical section taken on a line corresponding to line 15—15 of Fig. 3 showing details of the side flap-folding mechanism.
Figure 16:
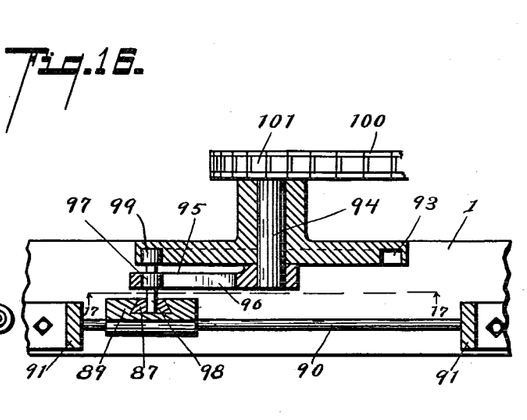
Fig. 16 is a detail section taken on a line corresponding to line 16—16 of Fig. 15.
Figure 17:
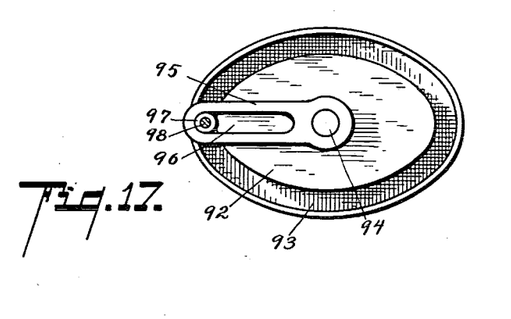
Fig. 17 is a horizontal section taken on a line corresponding to line 17—17 of Fig. 16.

The lever 77 is actuated by the cam 78 on the shaft 20 (see Figs. 4 and 7). This cam acts on a lever 79 which is connected by the link 80 to the lever 77, thus connecting the flap folding mechanism to the shaft 20, so that it is actuated in unison with the sealing conveyer and with the shifter mechanism described. The lever 79 is provided with a roller 81 which travels on the cam 78. As the carton is advanced by the sealing conveyer, its inner flaps are engaged and held down by the plate 82, see Fig. 2, and the side flaps are engaged by the flap turners or deflectors 83, which turn them outwardly so that their inner sides are properly presented to the glue wheels 84, which are mounted on the shaft 24. These flap turners are preferably in the form of diverging rods which are carried by the block 85 and project downwardly and rearwardly, so that their rear ends lie close to the under side of the glue wheels. After passing the glue wheels, one of the side flaps is engaged by one of the flap holders 86. These flap folders 86 are shaped somewhat like a moldboard, so that they engage under the flap and turn it gradually inwardly as the carton is advanced. The flap is then engaged by one of the flap pressers or closers 87, which is provided with a flap engaging roller 88 that moves inwardly and forwardly, pressing the flap down close against the folded inner flaps to seal it thereon. These flap pressers 87 are carried by carriages 89 which are mounted on rod-like ways 90 carried by the arms 91. See Figs. 3, 15 and 16. The carriage is moved back and forth on these ways and the flap presser reciprocated by means of the cams 92, which have cam grooves 93 in their faces, the cams being located above the carriages. The shafts 94 are arranged through these cams, and on the lower end of the shaft is a crank arm 95 having a longitudinal slot 96 therein in which the roller 97 of the pin 98 is arranged to travel. This pin is secured to the presser 87, and projects upwardly therefrom, the presser being reciprocatingly mounted on the carriage 89.

On the upper end of the pin 98 is a roller 99 which travels in the cam groove 93, so that, as the shaft 94 is revolved, the carriage 89 is reciprocated on its ways and the flat presser 87 reciprocated on the carriage, thus giving the presser roller a circular movement which allows it to act on the cartons as they are being advanced. The shaft 94 is driven by means of a sprocket chain 100, which connects the sprocket 101 on the shaft 94 to the sprocket 102 on the vertically arranged shaft 103. See Fig. 3. This shaft 103 is connected by the gears 104 and 105 to the shaft 20, which causes these parts to be driven in unison with the other parts described.

The flap folders 86 and 87 are arranged in series so that first one flap is acted upon and then the other, the second or outer side flap being folded down and sealed upon the inner. As these mechanisms are duplicates, the description given of one will suffice for both. The rear end of the flap retaining plate 82 preferably extends well under the flap turners 86, so that the inner or edge flaps are held down until one of the side flaps is folded thereon. After the cartons pass from engagement with the last flap presser 87, they are engaged by the retaining rollers 108, which are supported above the sealing conveyer by means of the hanger 109.

I preferably provide a delivery conveyer which is arranged to receive the cartons from the carton sealing conveyer, and this preferably consists of a pair of belts 110 arranged vertically to engage the sides of the cartons as the cartons are released by the flights of the sealing conveyer, carrying them rearwardly. These belts are driven from the pulleys 111 on the shafts 103, the supports and further details of the delivery conveyer not being illustrated, as they form no part of this invention.

The glue is supplied to the glue wheels by means of a receptacle 112, which is supported above the glue wheels, so that the glue wheels form the bottom thereof.

The sprocket wheel 23 is connected to the shaft by means of a clutch 113, so that the mechanism may be readily stopped or put in motion, as desired, the clutch being controlled by means of the hand lever 114.

My improved carton sealing machine is comparatively simple in structure, particularly when its capacity is taken into consideration.

I have illustrated and described the same in detail in the construction or embodiment of my invention preferred by me. I desire to remark, however, that I am aware that it is capable of very considerable variation in structure without departing from my invention, and I desire to be understood as claiming the same broadly.

Having thus described my invention, what I claim is new and wish to secure by Letters Patent is:—

1. The combination with a conveyer, of a feed belt arranged at the side of the forward end of said conveyer; a shifter adapted to transfer the cartons from said feed belt to said conveyer; a flap folding and sealing mechanism comprising a folder plate, a support therefor, carried by said shifter, a cam adapted to actuate said folder plate during the shifting movement of said shifter; a reciprocating flap folder adapted to swing rearwardly to fold the rear inner flap of a carton inwardly; a flap retaining plate arranged above said conveyer; a pair of glue wheels; a pair of flap turners located in front of said glue wheels for turning the side flaps of the cartons outwardly; oppositely-arranged flap folders arranged at the rear of said glue wheels, said flap retaining plate being arranged to project under said flap folders; flap pressers arranged at the rear of their respective flap folders, said flap pressers having an inward and rearward flap engaging movement, said folders and pressers being adapted to act successively on the flaps.

2. The combination with a conveyer, of a feed belt arranged at the side of the forward end of said conveyer; a shifter adapted to transfer the cartons from said feed belt to said conveyer; a flap folding and sealing mechanism comprising a folder plate, a support therefor, carried by said shifter, a cam adapted to actuate said folder plate during the shifting movement of said shifter; a reciprocating flap folder adapted to swing rearwardly to fold the rear inner flap of a carton inwardly; a flap retaining plate arranged above said conveyer; a pair of glue wheels; a pair of flap turners located in front of said glue wheels for turning the side flaps of the cartons outwardly, oppositely arranged flap folders arranged at the rear of said glue wheels, flap pressers arranged at the rear of their respective flap folders, said flap pressers having an inward and rearward flap engaging movement, said folders and pressers being adapted to act successively on the flaps.

3. The combination with a conveyer, of a feed belt arranged at the side of the forward end of said conveyer; a shifter adapted to transfer the cartons from said feed belt to said conveyer; a flap folding and sealing mechanism, comprising a folder plate, a support therefor, carried by said shifter, a cam adapted to actuate said folder plate during the shifting movement of said shifter; a reciprocating flap folder adapted to swing rearwardly to fold the rear inner flap of a carton inwardly; a flap retaining plate arranged above said conveyer; a pair of glue wheels; a pair of flap turners located in front of said glue wheels for turning the side flaps of the cartons outwardly, and oppositely-arranged flap folders arranged at the rear of said glue wheels, said flap retaining plate being arranged to project under said flap folders.

4. The combination with a conveyer, of a feed belt arranged at the side of the forward end of said conveyer; a shifter adapted to transfer the cartons from said feed belt to said conveyer; a flap folding and sealing mechanism, comprising a folder plate, a support therefor, carried by said shifter, a cam adapted to actuate said folder plate during the shifting movement of said shifter; a reciprocating flap folder adapted to swing rearwardly to fold the rear inner flap of a carton inwardly; a flap retaining plate arranged above said conveyer; a pair of glue wheels; a pair of flap turners located in front of said glue wheels for turning the side flaps of the cartons outwardly, and oppositely-arranged flap folders arranged at the rear of said glue wheels.

5. The combination with a conveyer, of a feed belt arranged at the side of the forward end of said conveyer; a shifter adapted to transfer the cartons from said feed belt to said conveyer; a flap folding and sealing mechanism comprising a folder plate, a support therefor, carried by said shifter, a cam adapted to actuate said folder plate during the shifting movement of said shifter; a reciprocating flap folder adapted to swing rearwardly to fold the rear inner flap of a carton inwardly; a pair of glue wheels; a pair of flap turners located in front of said glue wheels for turning the side flaps of the cartons outwardly, oppositely-arranged flap folders arranged at the rear of said glue wheels; and flap pressers arranged at the rear of their respective flap folders, said flap pressers having an inward and rearward engaging movement, said folders and pressers being adapted to act successively on the flaps.

6. The combination with a conveyer, of a feed belt arranged at the side of the forward end of said conveyer; a shifter adapted to transfer the cartons from said feed belt to said conveyer; a flap folding and sealing mechanism comprising a folder plate, a support therefor, carried by said shifter, a cam adapted to actuate said folder plate during the shifting movement of said shifter; a reciprocating flap folder adapted to swing rearwardly to fold the rear inner flap of a carton inwardly; a pair of glue wheels; a pair of flap turners located in front of said glue wheels for turning the side flaps of the cartons outwardly, and oppositely-arranged flap folders arranged at the rear of said glue wheels.

7. The combination with a conveyer, of a feed belt arranged at the side of the forward end of said conveyer; a shifter adapted to transfer the cartons from said feed belt to said conveyer; a flap folding and sealing mechanism comprising a folder plate, a support therefor, carried by said shifter, a cam adapted to actuate said folder plate during the shifting movement of said shifter; a reciprocating flap folder adapted to swing rearwardly to fold the rear inner flap of a carton inwardly; means for applying glue; oppositely-arranged flap folders arranged at the rear of said glue-applying means; flap pressers arranged at the rear of their respective flap folders, said flap pressers having an inward and rearward flap engaging movement, said folders and pressers being adapted to act successively on the flaps.

8. The combination with a conveyer, of a feed belt arranged at the side of the forward end of said conveyer; a shifter adapted to transfer the cartons from said feed belt to said conveyer; a flap folding and sealing mechanism comprising a folder plate, a support therefor, carried by said shifter, a cam adapted to actuate said folder plate during the shifting movement of said shifter; means of applying glue; oppositely-arranged flap folders arranged at the rear of said glue applying means; flap pressers arranged at the rear of their respective flap folders, said flap pressers having an inward and rearward flap engaging movement, said folders and pressers being adapted to act successively on the flaps.

9. The combination with a conveyer, of a feed belt arranged at the side of the forward end of said conveyer; a shifter adapted to transfer the cartons from said feed belt to said conveyer; a flap folding and sealing mechanism comprising a folder plate, a support therefor, carried by said shifter, a cam adapted to actuate said folder plate during the shifting movement of said shifter; a reciprocating flap folder adapted to swing rearwardly to fold the rear inner flap of a carton inwardly; means for applying glue; oppositely-arranged flap folders arranged at the rear of said glue applying means; and flap pressers arranged at the rear of their respective flap folders, said folders and pressers being adapted to act successively on the flaps.

10. The combination with a conveyer, of a feed belt arranged at the side of the forward end of said conveyer; a shifter adapted to transfer the cartons from said feed belt to said conveyer; a flap folding and sealing mechanism comprising a folder plate, a support therefor, carried by said shifter, a cam adapted to actuate said folder plate during the shifting movement of said shifter; means for applying glue; oppositely-arranged flap folders arranged at the rear of said glue applying means; and flap pressers arranged at the rear of their respective flap folders.

11. The combination with a conveyer, of means for folding the inner flaps of a carton; a retaining plate for said inner flaps arranged above said conveyer; a pair of glue wheels; a pair of flap turners located in front of said glue wheels for turning the side flaps of the cartons outwardly; oppositely arranged flap folders arranged at the rear of said glue wheels, said flap retaining plate being arranged to project under said flap folders; and flap pressers arranged at the rear of their respective flap folders, said flap pressers having an inward and rearward flap engaging movement, said folders and pressers being adapted to act successively on the flaps.

12. The combination with a conveyer, of means for folding the inner flaps of a carton; a pair of glue wheels; a pair of flap turners located in front of said glue wheels for turning the side flaps of the cartons outwardly; oppositely arranged flap folders arranged at the rear of said glue wheels, and flap pressers arranged at the rear of their respective flap folders, said flap pressers having an inward and rearward flap engaging movement, said folders and pressers being adapted to act successively on the flaps.

13. The combination with a conveyer, of means for folding the inner flaps of a carton; a pair of retaining plates for said inner flaps arranged above said conveyer; means for applying glue to the flaps of a carton; oppositely arranged flap folders arranged at the rear of said glue wheels, said flap retaining plates being arranged to project under said flap folders; and flap pressers arranged at the rear of their respective flap folders, said flap pressers having an inward and rearward flap engaging movement, said folders and pressers being adapted to act successively on the flaps.

14. The combination with a conveyer, of means for folding the inner flaps of a carton; means for applying glue to the flaps of a carton; oppositely arranged flap folders arranged at the rear of said glue wheels, and flap pressers arranged at the rear of their respective flap folders, said flap pressers having an inward and rearward flap engaging movement, said folders and pressers being adapted to act successively on the flaps.

15. The combination with a conveyer of a pair of glue wheels; a pair of flap turners located in front of said glue wheels for turning the side flaps of the cartons outwardly; oppositely arranged flap folders arranged at the rear of said glue wheels, and flap pressers arranged at the rear of their respective flap folders, said flap pressers having an inward and rearward flap engaging movement, and being provided with flap engaging rollers, said folders and pressers being adapted to act successively on the flaps.

16. The combination with a conveyer of a pair of glue wheels; a pair of flap turners located in front of said glue wheels for turning the side flaps of the cartons outwardly; oppositely arranged flap folders arranged at the rear of said glue wheels, and flap pressers arranged at the rear of their respective flap folders, said flap pressers having an inward and rearward flap engaging movement, said folders and pressers being adapted to act successively on the flaps.

17. The combination with a conveyer of glue applying means, oppositely arranged flap folders arranged at the rear of said glue applying means, and flap pressers arranged at the rear of their respective flap folders, said flap pressers having an inward and rearward flap engaging movement, and being provided with flap engaging rollers, said folders and pressers being adapted to act successively on the flaps.

18. The combination with a conveyer of glue applying means, oppositely arranged flap folders arranged at the rear of said glue applying means, and flap pressers arranged at the rear of their respective flap folders, said flap pressers having an inward and rearward flap engaging movement, said folders and pressers being adapted to act successively on the flaps.

19. The combination with a conveyer of a pair of feed belts arranged at each side of the forward end of said conveyer; a shifter adapted to transfer the carton from said feed belt to said conveyer; and a flap folder comprising folder plates and a pair of folder plate-supports upon which said plates are pivoted, ways for said cartons carried by said shifter, fulcrum arms for said folder plates, a cam plate having cam grooves therein, rollers carried by said folder plate-supports, arranged in said grooves, said cam grooves being shaped to actuate said folder plates during the movement of the said shifter.

20. The combination with a conveyer, of a feed belt arranged at the side of the forward end of said conveyer; a shifter adapted to transfer the cartons from said feed belt to said conveyer; and a flap folding and sealing mechanism comprising a folder plate, a support therefor, carried by said shifter, a cam adapted to actuate said folder plate during the shifting movement of said shifter.

21. The combination with a conveyer, of a feed belt arranged at the side of the forward end of said conveyer; a shifter adapted to transfer the cartons from said feed belt to said conveyer; and a flap folding and sealing mechanism comprising a folder plate, a support therefor, carried by said shifter, and means for actuating said folder plate during the shifting movement of said shifter.

22. The combination with a conveyer, of a pair of feed belts arranged at each side of the forward end of said conveyer, a shifter adapted to transfer the cartons from said feed belts to said conveyer; and a flap folding and sealing mechanism, comprising a pair of folder plates, supports therefore carried by said shifter, and cams adapted to actuate said folder plates during the shifting movement of said shifter.

23. The combination with a conveyer, of a pair of feed belts arranged at each side of the forward end of said conveyer, a shifter adapted to transfer the cartons from said feed belts to said conveyer; and a flap folding and sealing mechanism, comprising a pair of folder plates, supports therefor carried by said shifter, and means for actuating the said folder plates during the shifting movement of said shifter.

24. The combination with a conveyer, of a flap folder comprising a striker; pairs of supporting links therefor; a connecting bar for the upper ends of said links; a lever connected to said bar; and driving connections for said levers and said conveyer, whereby the operation of said flap folder is timed.

25. The combination with a conveyer, of a flap folder comprising a striker; pairs of supporting links therefor; a connecting bar for the upper ends of said links; and a lever connected to said bar.

26. The combination with a conveyer, of a flap presser comprising a presser arm, a flap engaging roller carried thereby; a carriage on which said presser arm is reciprocally mounted; ways on which said carriage is mounted to reciprocate, the movement of said presser arm on the carriage being transverse to the movement of the carriage; an elliptical cam; a shaft arranged centrally through said cam; a crank arm on said shaft having a longitudinal slot therein; a pin on said presser arm having rollers therein arranged to engage said slot in said crank arm and said cam whereby said presser arm is reciprocated in its carriage and said carriage reciprocated on its ways; and driving connections for said shaft to said conveyer.

27. The combination with a conveyer, of a flap presser comprising a presser arm; a carriage on which said presser arm is reciprocatingly mounted; ways on which said carriage is mounted to reciprocate, the movement of said presser arm on the carriage being transverse to the movement of the carriage, an elliptical cam; a shaft arranged centrally through said cam; a crank arm on said shaft having a longitudinal slot therein; a pin on said presser arm having rollers therein arranged to engage said slot in said crank arm and said cam whereby said presser arm is reciprocated in its carriage and said carriage reciprocated on its ways; and driving connections for said shaft to said conveyer.

28. In a machine of the character described, a series of top flap folding devices, means whereby glue is applied to the flaps, carton supporting plates, a carton carrying chain adapted to travel between said plates, a plurality of followers secured at intervals to said chain and adapted to engage and carry the cartons along over said supporting plates and into engagement with said folding and glue applying devices; means whereby the cartons are fed to the machine; and alternately actuated means at opposite sides of the machine to push one carton at a time in front of each of said followers.

29. The combination of a sealing mechanism comprising a conveyer, a pair of feed conveyers disposed one at each side of the shifter adapted to shift the cartons alternately from said feed conveyers to said sealing mechanism conveyer.

30. The combination of a sealing mechanism comprising a conveyer, a pair of feed conveyers disposed one at each side of said sealing mechanism conveyer, and means for feeding cartons alternately from said feed conveyers to said sealing mechanism conveyer.

31. In a machine of the character described, a series of top flap folding devices; means whereby glue is applied to the flaps; a carton conveyer having a plurality of followers secured at intervals thereto and adapted to engage and carry the cartons into engagement with said folding and glue applying devices; means whereby the cartons are fed to the machine; and alternately actuated means at opposite sides of the machine to push one carton at a time in front of each of said followers.

In witness whereof, I have hereunto set my hand and seal in the presence of two witnesses.

HARRY L. JOHNSON. [L. S.]

Witnesses:
 ERIC E. COVERT,
 FLOYD R. POOLE.